Patented July 9, 1935

2,007,682

UNITED STATES PATENT OFFICE 2,007,682

COOKING UTENSIL

Otto Herting, Philadelphia, Pa., assignor, by mesne assignments, to Edward O. Bogert, New York, N. Y.

No Drawing. Application October 31, 1931, Serial No. 572,450

16 Claims. (Cl. 53—6)

This invention relates to a cooking utensil and more particularly to a cooking utensil formed from normally inflammable material which has been treated to render it heat resistant or fireproof at temperatures used in cooking.

This invention is more particularly adaptable to cooking utensils formed from inflammable absorptive material as, for example, kraftboard, which has been treated to render it heat resistant or fire-proof at cooking temperatures as, for example, a temperature of 400° Fahrenheit such as is used in baking.

Heretofore it has been known to produce cooking utensils, as, for example, for use in the baking of pies, etc., from an absorptive fibrous material as kraftboard rendered heat resistant or fireproof, at baking temperatures, by treatment with, for example, silicate of soda, or by treatment or impregnation with a water insoluble metallic silicate as, for example, aluminum silicate. A cooking utensil of the type to which this invention is applicable may, for example, be in accordance with United States Letters Patent No. 914,238 dated March 2, 1909 to Bruner, which discloses a cooking utensil rendered heat resistant or fireproof by treatment with silicate of soda. Again this invention is applicable to a cooking utensil such as is disclosed in United States Letters Patent No. 1,699,843 to Otto Herting, dated January 22, 1929, which discloses a cooking utensil formed from, for example, kraftboard and rendered heat resistant, or fireproof, by treatment with sodium sulphate, borax and silicate of soda, or with a complex silicate formed in the kraftboard by the reaction, for example, of aluminum sulphate with sodium silicate, the reagents being introduced into the kraftboard through the subjection of kraftboard first to a solution of aluminum sulphate then to a solution containing sodium silicate.

While cooking utensils formed from normally inflammable material as heretofore produced have been found to be possessed of desirable characteristics and to be substantially efficient, they have been found to be open to a serious objection, more particularly when used in connection with the cooking of foods including fruits or fruit juices, as for example in connection with the baking of pies such as huckleberry, blackberry, etc. pie, since the utensils become badly stained by such fruit juices.

Thus, for example, in the baking of a huckleberry pie in such a utensil or pie plate, as heretofore known, the utensil, or plate, becomes more or less stained green. The green stain appears to resemble verdigris or mould and creates the impression in the mind of an observer that some poisonous material is present in the plate and which will deleteriously affect the pie. The green color produced in the cooking of a huckleberry pie, and which will not only more or less stain the surface of the plate but will likewise more or less stain the under side of the pie, creates the impression that the utensil, for example, contains copper or that the pie is not fresh and has become mouldy.

As a result of study of the disadvantages indicated in connection with cooking utensils of the type here contemplated as heretofore known it has been found that the staining or discoloration of the utensil, where used in connection with the cooking of fruit or of dishes as pies containing fruit juices, is due to the fact that, as heretofore known, such utensils, and more particularly the inner surface thereof, in contact with food being cooked therein, are alkaline in reaction and operate to neutralize or even render alkaline the weakly acidic fruit juices. Thus, where the fruit juices contain coloring matters of the nature of indicators, that is to say, having different colors depending on whether they are in an acid or alkaline medium. When the acidic nature of the fruit juices, as huckleberry juice, blackberry juice, etc. is neutralized or rendered alkaline by contact with the utensil the color of the juice changes. Thus, as indicated above, huckleberry juice, normally blue, will turn green.

Now in accordance with this invention based upon my study and observation I have found that if cooking utensils of the character indicated, and more particularly the inner surface thereof, be rendered non-alkaline as by suitable treatment of the utensil, or of its inner surface, or by a suitable coating of its surface and more particularly its inner surface, or by treatment of the material with a non-alkaline substance which will render the material desirably heat resistant, the utensil and articles cooked therein, where the articles contain fruit juices, will not become stained as heretofore due to change in color of the fruit juices.

Thus from a broad standpoint this invention contemplates a cooking utensil formed from normally inflammable material, treated in any suitable manner to render the material resistant to heat at cooking temperatures, and which presents an inner surface which is non-alkaline in reaction. As indicated, it is contemplated as within the scope of this invention that the inner surface of the utensil may be normally non-alkaline due to the substance or substances used to render it heat resistant, or the surface of the utensil may be treated to render it non-alkaline or may be coated with a non-alkaline coating. It is to be understood by the term "non-alkaline" neutrality or acidity is contemplated.

As illustrative of the practical adaptation of this invention, for example, a baking plate formed from kraftboard which has been rendered desirably heat resistant by treatment with silicate of soda, is treated with an acid in such manner as to render the inner surface of the plate and the portion of the body thereof immediately adjacent thereto non-alkaline in reaction. The plate may be treated as a whole and such will be desirable, but it will be understood that it is only essential that the inner surface of the plate which comes in contact with fruit juices which may be contained therein be treated.

In treatment of the plate with an acid any suitable acid may be used, it being borne in mind that the use of a strong acid such as would destroy the material forming the plate and of acids which would be deleterious to the human system must be avoided. Any relatively weak acid which will not have a deleterious effect on the human system may be used, for example, malic acid, formic acid, tartaric, citric, etc. The acid may be applied either in pure state or aqueous or other solution in any suitable manner as by spraying, dipping, etc., and may be used in any desired quantity, it being understood that the purposes of the application of the acid is to render the interior surface of the plate non-alkaline, it being unimportant whether or not the surface of the plate is rendered more or less acid. Thus, for example, the inner surface of the plate, or the whole plate, may be sprayed with 90% formic acid, sufficient acid being applied to insure neutralization of silicate of soda on and/or immediately adjacent the inner surface of the plate. Desirably the entire plate will be treated with acid since where the plates, as is customary, are nested for shipment and storage if the inner surface only be treated the effect of the treatment may be lost through contact of the inner surface of one plate with the untreated alkaline outer surface of another.

As further illustrative of the practical adaptation of this invention involving provision of a utensil with a non-alkaline coating, a plate such as that described in the Bruner Patent No. 914,238 or in the Herting Patent 1,699,843, may be coated on its inner surface with any suitable coating, the surface of which will give a non-alkaline reaction and which will be resistant to cooking temperatures. Thus, for example, the inner surface of the plate or the whole plate may be coated with, for example, a casein paint which may or may not contain pigment as desired. A suitable casein paint may, for example, be made up on the following formula:

| | Parts |
|---|---|
| Casein | 50 |
| Ammonia (26° Bé.) | 10 |
| Formaldehyde | 2 |
| Titanium dioxide | 160 |
| Water | 450 |

The paint may be applied to the inner surface of the plate, or to the whole plate, in any suitable manner as by spraying or brushing.

Where the adaptation of this invention involves the application to the inner surface of a utensil of a paint presenting a non-alkaline surface it may be that some slight stain or discoloration may appear due to penetration of the fruit juices through the coating to the alkaline surface of the utensil, where the coating is not wholly impervious. With the use of a non-alkaline coating such as indicated, penetration by fruit juices will be at a minimum and discoloration will be negligible. However, if it is desired that discoloration be entirely avoided the inner surface of the utensil may be treated with an acid to render it non-alkaline before application of the paint coat. As a further illustration of the practical adaptation of this invention, for example, the invention may be adapted to utensils as heretofore known by the application to the inner surface thereof of a coating rendered non-alkaline, that is to say neutral or acid, so far as the indicator characteristics of the coloring matter of the juice, for example, blueberry juice, is involved, by the inclusion of suitable acid and/or acid salts as an ingredient. For example, a suitable coating may comprise an aqueous solution of aluminum sulphate, flour and a suitable acid in water. A satisfactory coating composition may be made up from the following formula:

6% aqueous solution of aluminum sulphate
4.5 ounces of malic acid, formic acid, or the like
1 pound of flour In making up the coating composition indicated the aluminum sulphate is dissolved in boiling water and malic acid, formic acid, or the like, added. The flour is then added with continued boiling. When the flour is dissolved water may be added to bring the composition to the desired consistency. The flour which acts to give body to the composition may be replaced by any suitable materials such as starch, mucilage, gum arabic, gelatine, etc. Where it is desired to pigment the coating composition such may be accomplished, for example, by adding to the solution a mixture comprising 20 oz. titanium dioxide, 5 oz. talcum, 5 oz. aluminum acetate. The coating composition indicated may be applied by brushing, spraying, or otherwise after being reduced to suitable consistency by the addition of water. As will be appreciated, the coating composition indicated may be applied merely to the inner surface of the utensil, or the utensil may be completely coated therewith and it will be found that the coating indicated will give to the utensil an enameled appearance and will increase its heat resistance.

As a further illustration of the practical adaptation of this invention, a utensil embodying the invention may be produced by such treatment of the material from which it is formed in connection with rendering it heat resistant that the inner surface of the utensil will be normally non-alkaline. Thus, for example, a utensil having a non-alkaline surface and non-alkaline immediately adjacent its surface may be produced by a reversal of the treatment disclosed in the Herting Patent 1,699,843.

Thus in the production of a utensil embodying this invention, for example, kraftboard may be rendered heat resistant by first saturating it with a solution of, for example, silicate of soda and, if desired, also sodium sulphate and borax, the latter operating as a dryer, and then after partially drying, saturating it in a solution of, for example, aluminum sulphate and titanium sulphate in water. Under such treatment the aluminum sulphate and titanium sulphate will react with silicate of soda present on and immediately adjacent to the surface of the kraftboard for the production of aluminum and titanium silicates.

The aluminum and titanium silicates thus formed on and immediately adjacent the surface of the kraftboard are non-alkaline in reaction. Hence, when the kraftboard is formed into a utensil as by pressing in a die the surface of the utensil and particularly the inner surface thereof will present normally a non-alkaline surface.

As a still further illustration of the practical adaptation of this invention a utensil embodying the invention may be produced by treating the normally inflammable material forming the base of the utensil to render it heat resistant with a substance normally non-alkaline. Thus, for example, the material from which the utensil is formed may be rendered heat resistant by effecting its impregnation with, for example, ethyl silicate which is normally non-alkaline. In accordance with the disclosure of the application for United States Letters Patent of Serial No. 567,992, filed October 9, 1931, in which is disclosed a treatment involving impregnation of normally inflammable material with ethyl silicate in solution in an organic solvent, as for example, alcohol, it will be understood that various modifications in the practical adaptation of this invention as described may be made without departing from the spirit thereof.

It will be understood that this invention from a broad standpoint contemplates a cooking utensil formed from normally inflammable material rendered resistant to heat at cooking temperatures and the inner surface of which is non-alkaline in reaction, however the non-alkalinity is accomplished.

It will be understood that "kraft-board", as referred to herein, is the board generally known as produced from kraft pulp.

This application is filed as a continuation in part of the application filed by me for improvement in cooking utensil, Serial No. 486,743, filed October 6, 1930.

What I claim and desire to protect by Letters Patent is:

1. A cooking utensil formed of absorptive material treated with a substance having an alkaline reaction to render it heat resistant at cooking temperatures and having its inner surface rendered non-alkaline in reaction with a substance and non-fluid at baking temperatures.

2. A cooking utensil formed of normally inflammable absorptive material containing silicate of soda, the inner surface of the utensil having been rendered non-alkaline in reaction and being non-fluid at baking temperatures.

3. A cooking utensil formed from normally inflammable material treated to render it resistant to heat at cooking temperatures with a substance having an alkaline reaction and treated on its inner surface with a weak acid to render the inner surface non-alkaline.

4. A cooking utensil formed from normally inflammable material treated with a substance having an alkaline reaction to render it heat resistant at cooking temperatures and having its inner surface coated with an acidic composition.

5. A cooking utensil formed from normally inflammable material treated with a substance having an alkaline reaction to render it heat resistant at cooking temperatures and having its inner surface coated with an acidic composition including a weak acid and a pigment as ingredients.

6. A cooking utensil formed from normally inflammable material treated with a substance having an alkaline reaction to render it heat resistant at cooking temperatures and having its inner surface coated with an acidic composition including a fruit acid and titanium dioxide as ingredients.

7. A cooking utensil formed from kraft-board rendered resistant to heat at cooking temperatures and the interior surface of which is non-alkaline in reaction and non-fluid at baking temperatures.

8. A cooking utensil formed from kraft-board treated to render it resistant to heat at cooking temperatures with a substance normally non-alkaline in reaction.

9. A cooking utensil resistant to baking temperatures formed from normally inflammable fibrous material and coated interiorly with a material non-alkaline in reaction and non-fluid at baking temperatures.

10. A cooking utensil resistant to baking temperatures formed from normally inflammable fibrous material and coated interiorly with a non-alkaline coating containing a pigment, said coating being non-fluid at baking temperatures.

11. A cooking utensil resistant to baking temperatures formed from normally inflammable fibrous material and coated interiorly with a non-alkaline coating containing a pigment, an organic binder and an acidic material.

12. A cooking utensil resistant to baking temperatures formed from normally inflammable fibrous material the body of which is alkaline and the interior surface of which is non-alkaline in reaction and non-fluid at baking temperatures.

13. A cooking utensil resistant to baking temperatures formed from normally inflammable fibrous material, the body of which is alkaline and the interior surface of which is acidic.

14. An absorptive cooking utensil resistant to baking temperatures formed of an alkaline composition and coated on its inner surface with an acidic composition.

15. An absorptive cooking utensil resistant to baking temperatures formed of an alkaline composition and coated on its inner surface with an acidic composition including a film-forming material.

16. An absorptive cooking utensil resistant to baking temperatures formed of an alkaline composition and coated on its inner surface with an acidic composition including a film-forming material and a pigment.

OTTO HERTING.